United States Patent [19]

Gabbita

[11] Patent Number: 4,913,586
[45] Date of Patent: Apr. 3, 1990

[54] MIXTURE FOR DETOXIFICATION OF CONTAMINATED SOIL

[75] Inventor: Kasi V. Gabbita, Stanton, Calif.

[73] Assignee: Analytical Liquid Waste Systems, Inc., Huntington Beach, Calif.

[21] Appl. No.: 231,948

[22] Filed: Aug. 15, 1988

[51] Int. Cl.$^4$ .................. C09L 17/00; E02D 3/12
[52] U.S. Cl. .................. 405/129; 405/264; 106/120; 210/728; 210/751
[58] Field of Search ............ 405/129, 263, 264, 265, 405/266, 128; 106/119, 120; 210/728, 751

[56] References Cited

U.S. PATENT DOCUMENTS

| | | | |
|---|---|---|---|
| 1,635,212 | 7/1927 | Herrly | 106/119 |
| 3,793,841 | 2/1974 | Dozsa | 405/263 |
| 3,932,166 | 1/1976 | Vignovich et al. | 71/11 |
| 4,028,130 | 6/1977 | Webster et al. | 405/129 |
| 4,084,382 | 4/1978 | Clem | 405/264 |
| 4,615,809 | 10/1986 | King | 405/129 X |
| 4,701,219 | 10/1987 | Bonee | 405/129 X |

Primary Examiner—Randolph A. Reese
Assistant Examiner—Arlen L. Olsen
Attorney, Agent, or Firm—Roger A. Marrs

[57] ABSTRACT

A method and apparatus for safely handling and detoxification of contaminated soil substantially saturated with PH contaminants such as fuel and petroleum hydrocarbons is disclosed which treats the contaminated soil with an additive consisting of low grade humic acid and lime that is mixed with the soil in the approximate ratio of nine parts soil to one part of additive. The treatment involves digging a trench while collecting toxic soil, reducing particle size to a fine silt or sand-like particle size followed by introducing the additive for mixing in a tumbler and, finally, discharge of the thoroughly covered additive and encapsulated toxic soil particles into the previously dug trench.

1 Claim, 1 Drawing Sheet

MIXTURE FOR DETOXIFICATION OF CONTAMINATED SOIL

BACKGROUND OF THE INVENTION

1. Field of the Invention

The present invention relates to a method and apparatus for the treatment of soil contaminated with petroleum hydrocarbons and more particularly to a novel treatment which collects the contaminated soil and encapsulates or seals particles thereof whereby removed soil from a trench can be safely discharged into the trench so as to constitute a safe landfill.

2. Brief Description of the Prior Art

The problem of contaminated soil disposal is a continuing problem due to the fact that the soil oftentimes contains high levels of toxic materials which are damaging or detrimental to the health of inhabitants or personnel coming into contact with the toxic soil. In order to dispose of the toxic soil, the current method of disposal having a high content of petroleum hydrocarbons, for example, is to haul the contaminated soil to a hazardous landfill site. Difficulties and problems have been encountered with this procedure which stem largely from the fact that it is economically costly and increasingly imposes a limitation on available hazardous landfill sites. Such hazardous waste or landfill sites in the reasonable foreseeable future are expected to be severely limited by legislation and, therefore, the probability of more new landfill sites that will accept hazardous chemicals and material is seriously questioned.

It appears that the current methods of toxic waste disposal are merely to relocate the same material from one location to another. After a period of time, the new site location becomes as hazardous to surrounding personnel so that additional removal is required. Furthermore, the toxicity of the material, such as petroleum hydrocarbon contaminated soil, is particularly hazardous to personnel collecting, storing and transporting the toxic soil from one location to another.

Therefore, a long standing need has existed to provide a safe and economical means for treating and handling of petroleum hydrocarbon contaminated soil so that the treated soil will meet or exceed governmental established regulations and standards.

SUMMARY OF THE INVENTION

Accordingly, the above problems and difficulties are obviated by the present invention which provides a novel means for detoxifying fuel and petroleum hydrocarbon contaminated soil which involves the treatment of the soil by reducing the soil to small particles that are mixed with a low grade of humic acid and lime in the form of an additive whereby the additive encapsulates or seals the small particles so that the toxic material is contained and prevented from release. The proportion or ratio between the contaminated soil and the additive mixture of the present invention varies depending upon the level of the petroleum hydrocarbons in the soil and the degree of lowering of petroleum hydrocarbon levels required. Typically, the ratio runs about 9:1 (contaminated soil to the mixture).

The treated soil is then replaced as landfill into the trench from which it has been initially dug preparatory to the treatment. Apparatus is provided that includes digging means for collecting the contaminated soil and means for reducing the soil to particle size and further includes means for adding the additive to the particles so that they may be subsequently mixed whereby the particles are covered and sealed by the additive. Discharge means are provided from the mixer for placing the treated soil into the cavity or trench from the soil was originally removed.

Therefore, it is among the primary objects of the present invention to provide a novel treatment for contaminated soil with high levels of petroleum hydrocarbons in the soil matrix whereby the particles of soil are captured and sealed so that toxic risk and potential to contaminate underlying water table or ground water is substantially reduced.

Another object of the present invention is to provide a novel treatment method and apparatus for contaminated soil which includes an additive composed of humic acid and lime that is mixed with particles of the contaminated soil so as to seal and cover the particles whereby the toxic constituency of the soil is captured and held in place so that the resultant treated soil will meet governmental standards for safety.

Another object of the present invention is to provide an inventive treatment so as to render petroleum hydrocarbon soil innocuous so that the treated soil may be subsequently transported to a safe landfill site.

Yet another object of the present invention is to provide a novel technology for contaminated soil with petroleum hydrocarbons that effectively locks in the petroleum and fuel hydrocarbons into the particles of soil that reside in soil matrix whereby leakage and other forms of leeching of toxic substances is prevented from encroaching on the surrounding environment.

Another object of the present invention is to provide a novel detoxification of fuel and petroleum hydrocarbons accumulated in contaminated soil which were the result of leakage from underground fuel tanks or the like whereby such contaminated soil is rendered safe for handling and as a landfill.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

The present invention relates to the detoxification of fuel and petroleum hydrocarbon contaminated soil and of particular concern is the area of decontamination, either on-site or away from the contaminated ground, of soil suspected to contain petroleum hydrocarbons, such as fuel, diesel oil or the like. Many situations are currently being experienced where either due to leakage of underground fuel tanks or because of other unknown reasons, an area of soil up to several meters in depth is found to contain traces of toxic amounts of petroleum hydrocarbons (PHs).

Figure 1:
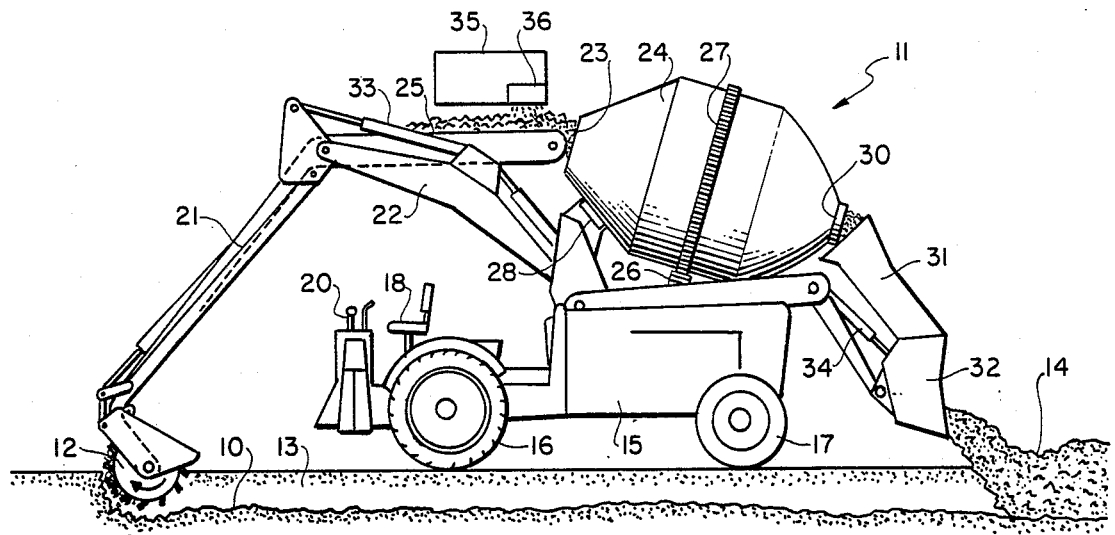
FIG. 1 is a side elevational view of an apparatus for performing the novel treatment for contaminated soil in accordance with the present invention.

Referring to FIG. 1, contaminated soil having high levels of petroleum hydrocarbons is indicated in general by numeral 10 and apparatus for removing the soil is indicated in the general direction of arrow 11 so that the soil may be treated in accordance with the inventive method. It is important to note that the apparatus 11 includes a digging means 12 for removing soil from ground 10 so that a trough or trench 13 is formed. After treatment of the soil, the apparatus 11 discharges the treated soil, as indicated by numeral 14, back into the trench 13 which serves as a landfill that is either nontoxic or which will at least meet the governmental standards and regulations.

The apparatus 11 further includes a main chassis 15 housing a suitable engine for powering the vehicle on wheels 16 and 17 which straddle a trench 13. A driver can occupy seat 18 while controls 20 permit manual operation of an articulated arm 21 and support 22 pivotally carrying the arm 21 on the end thereof. Operably disposed between the digging means 12 and the entrance 23 leading into a rotating mixer 24, there is provided a conveyor system 25 for conducting the soil from the trench 13 across the arm 21 and support 22 for dumping into the mixer 24. The conveyor system 25 includes a plurality of steps or plates which hold the soil on the belt during its transport regardless of the angular disposition of the arm 21. Also, the digging means 12 includes a plurality of scrapers or projections on its external periphery that engage and dislodge the soil from the ground area for disposition onto the conveyor 25.

The apparatus 11 further includes means within the chassis 15 for revolving the mixer 24 via a drive gear 26 meshing with a ring gear 27 carried about the external periphery of the cylindrical mixer 24. The mixer is further supported by a bearing means 28 that substantially delivers load forces to the chassis 15. The opposite end of the cylindrical mixer 24 from its end 23 includes a discharge orifice 30 in alignment with a discharge conduit 31. Material after treatment within the mixer is conducted through the ducting 31 for discharge into the cavity of the trench 13 via the nozzle 32.

Various piston and ram assemblages, such as assemblage 33, are employed for moving the articulated arm 21 into an out of position and, other assemblages, such as assemblage 34, are employed for positioning the nozzle 32. By employing the apparatus 11, the treatment of soil removed from ground 10 may be done in a dynamic fashion as the chassis is moved on its wheels at a predetermined speed across the contaminated terrain. However, it is to be understood that the vehicle can also be stopped and the apparatus operated in a stationary position as well.

An important feature of the present invention is the inclusion of a hopper 35 which includes an outlet 36. The additive is poured into the hopper 35 and released through the outlet 36 into mixture with the soil carried on the conveyor 25. Therefore, a premixing stage is employed whereby the additive and the soil are premixed prior to introduction into the mixing chamber of the mixer 24. Also, it is to be understood that during the digging operation, filters, strainers or the like may be employed for reducing the soil from clods to particle size so that the additive can readily encase or encapsulate the particles when thoroughly mixed. As an example, a 35–40 mesh screen can be incorporated for filtering the soil prior to mixture. Any soil not passing through the filter can be reintroduced after crushing or other steps effective to reduce particle size.

With respect to the additive, it is important to note that the additive is substantially composed of humic acid and lime that are mixed together in a dry state in the hopper 35 by stirring, tumbling or the like. No water is required since the ground 10 is in a normal state in which its moisture content is roughly 15 to 20% of its composition. Preferably, the proportion or the ratio between the contaminated soil and the inventive additive varies depending upon (1) the level of petroleum hydrocarbons in the soil and (2) the degree of lowering of the level of petroleum hydrocarbons required. Typically, the ratio runs approximately 9 parts of soil to 1 part additive. The additive may take the form of humic acid and lime or, in some instances, 9 parts of humic acid can be combined with 1 part lime and 1 part of a soil separate, such as bentonite clay, glass, silt, sand or the like.

The mixing step within the mixer 24 is of a tumbler nature in which the additive is thoroughly mixed with the contaminated soil particles. The toxic substances within the soil particles are substantially "locked up" or encapsulated so as to prevent the release of the toxic component in the contaminated petroleum hydrocarbons. These toxic substances cannot escape from the barrier or binding action of the additive which encapsulates the contaminated soil. A factor in the inventive treatment is the residence time required for mixing of the soil and the treatment additive. The residence time may vary from one hour to several hours depending upon the extent of contamination and history of the contaminated soil. Typical mixing technology involves use of crushers, stirrers and mechanical mixers which are operated by a motive power, either mechanical or electrical.

The results of one typical test are summarized in Table 1:

TABLE 1

Results (summary) of levels (parts per million, ppm) of fuel hydrocarbons (total petroleum hydrocarbons, TPHs) analyzed according to EPA protocol #8015

| | TPHs (ppm) in the soil | |
|---|---|---|
| | Before treatment | After treatment |
| Head space analysis (diesel) | 110 | 26 |
| Methylene Chloride extract (10 g soil extracted with 10 ml Methylene Chloride) | 36,000 | 25,000 |

Therefore, it can be seen from the above that the novel and inventive soil treatment incorporating the present invention "locks up" petroleum and fuel hydrocarbons that reside in soil matrix due to leak or other ways of contamination from underground fuel tanks. This new innovation is capable of lowering diesel vapors up to 76% and extractable gasoline hydrocarbons up to 31% in a matter of a few hours of intimate mechanical mixing with the inventive additive chemicals that are not toxic or harmful to microbial, plant, animal or human life, or to the environment.

Figure 2:
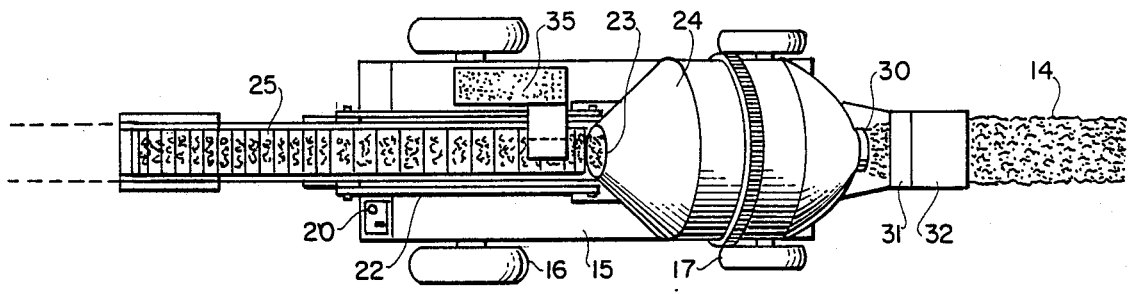
FIG. 2 is a top plan view of the apparatus shown in FIG. 1.

Furthermore, referring to FIG. 2, it can be seen that the removed soil from the trench 13 is redeposited into the same trench at the trailing edge of the apparatus 11. Such a procedure employs the decontaminated or detoxified soil as fill material which can later be compacted and put to a good use without danger of toxic reaction. FIG. 2 also shows that the removed contaminated soil is elevated by the conveyor 25 and that the additive in hopper 35 is introduced to the soil on the conveyor preparatory for dumping or loading into the mixer 24.

Figure 3:
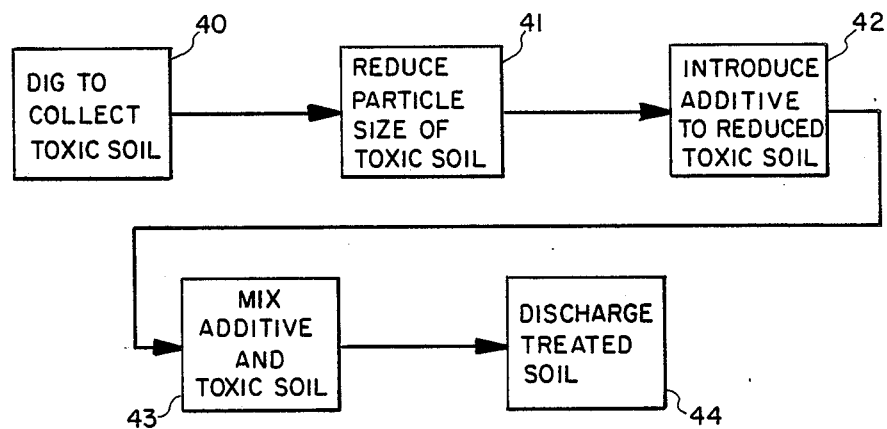
FIG. 3 is a block diagram showing the method of treatment employing the apparatus of FIGS. 1 and 2.

Referring now in detail to FIG. 3, the method of treatment incorporating the present invention takes into account initially digging into the soil 10 to collect the contaminated or toxic soil, as indicated by block 40, and wherein the collected soil is then reduced in particle size, as indicated by block 41. Subsequently, the contaminated soil particles are subjected to introduction of the additive, as indicated by block 42, preparatory for loading into the mixer. Block 43 indicates mixing of the additive and the toxic soil particles together so that the additive thoroughly covers or coats the particles so that the toxic contents cannot be released. The mixed additive and toxic soil is then discharged, as indicated by block 44, into containers, the trench from which the contaminated soil was initially excavated, or into trucks for transportation and disposal at remote sites.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In the treatment of a quantity of petroleum hydrocarbon contaminated soil particles saturated with toxic components in surface exposure of said particles, the improvement which comprises the combination of:

a protective mixture chemically reactive with said hydrocarbon contaminated soil particles, consisting of humic acid and lime having a ratio of 9:1 (contaminated soil to said mixture);

said protective mixture surrounding each particle to encase said toxic components by covering the entire external surface of each particle in bonded chemical fixation relationship therewith so as to interfere with release of said toxic components from said particle;

said humic acid and lime mixture is dry and chemically attaches to each particle external surface to provide an encapsulating coating;

said protective mixture includes a soil separate selected from;
   a. clay
   b. glass
   c. silt sand.

* * * * *